(12) United States Patent
Yu et al.

(10) Patent No.: US 6,398,858 B1
(45) Date of Patent: Jun. 4, 2002

(54) PROCESS FOR PREPARING COLORED PIGMENTS

(75) Inventors: Yuan Yu, North Billerica; Ronald J. Gambale, Wakefield; Robert M. Amici, Berlin, all of MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/517,857

(22) Filed: Mar. 3, 2000

Related U.S. Application Data

(60) Provisional application No. 60/122,941, filed on Mar. 5, 1999.

(51) Int. Cl.$^7$ .......................... C09B 67/00; C09D 11/00; C09C 3/08; C09C 1/56

(52) U.S. Cl. ................ 106/31.64; 106/412; 106/413; 106/472; 106/476; 106/493; 106/494; 106/495; 106/496; 106/497; 106/498

(58) Field of Search ............... 106/31.6, 412, 106/413, 472, 476, 493, 494, 495, 496, 497, 498, 31.64

(56) References Cited

U.S. PATENT DOCUMENTS

| | | | |
|---|---|---|---|
| 5,026,427 A | 6/1991 | Mitchell et al. | 106/23 |
| 5,281,261 A | 1/1994 | Lin et al. | 106/20 R |
| 5,418,277 A | 5/1995 | Ma et al. | 524/520 |
| 5,554,739 A | 9/1996 | Belmont | 534/885 |
| 5,571,311 A | 11/1996 | Belmont et al. | 106/20 |
| 5,630,868 A | 5/1997 | Belmont et al. | 106/31.75 |
| 5,672,198 A | 9/1997 | Belmont | 106/20 |
| 5,679,138 A | 10/1997 | Bishop et al. | 106/20 |
| 5,698,016 A | 12/1997 | Adams et al. | 106/316 |
| 5,707,432 A | 1/1998 | Adams et al. | 106/31.6 |
| 5,713,988 A | 2/1998 | Belmont et al. | 106/31.6 |
| 5,803,959 A | 9/1998 | Johnson et al. | 106/31.75 |
| 5,837,045 A | 11/1998 | Johnson et al. | 106/31.85 |
| 5,851,280 A | 12/1998 | Belmont et al. | 106/472 |
| 5,885,335 A | 3/1999 | Adams et al. | 106/316 |
| 5,895,522 A | 4/1999 | Belmont et al. | 106/31.6 |
| 5,922,118 A | 7/1999 | Johnson et al. | 106/31.6 |
| 5,955,232 A | 9/1999 | Little et al. | 430/106 |
| 5,958,999 A | 9/1999 | Bates et al. | 523/161 |
| 5,968,243 A | 10/1999 | Belmont et al. | 106/31.65 |
| 6,042,643 A | 3/2000 | Belmont et al. | 106/472 |

FOREIGN PATENT DOCUMENTS

| | | | |
|---|---|---|---|
| EP | 0 475 075 A1 | 3/1992 | C09D/11/00 |
| EP | 0 677 556 A2 | 10/1995 | C09B/67/08 |
| EP | 0 688 836 A2 | 12/1995 | C09D/11/02 |
| EP | 0 839 883 | 5/1998 | C09D/11/00 |
| GB | 2 330 842 | 5/1999 | C09B/67/54 |
| JP | 56-147865 | 11/1981 | C09D/11/00 |
| JP | 57-21466 | 2/1982 | C09D/11/00 |
| JP | 64-48875 | 2/1989 | C09D/11/16 |
| WO | WO96/18688 | 6/1996 | C09C/1/56 |
| WO | WO96/18690 | 6/1996 | C09C/1/56 |
| WO | WO96/18695 | 6/1996 | C09D/11/00 |
| WO | WO96/18696 | 6/1996 | C09D/11/02 |
| WO | WO97/47697 | 12/1997 | C09D/11/00 |
| WO | WO97/47699 | 12/1997 | C09D/11/00 |
| WO | WO97/48769 | 12/1997 | C09B/67/22 |
| WO | WO99/05575 | 2/1999 | G03G/9/09 |
| WO | WO99/31175 | 6/1999 | C08K/9/04 |
| WO | WO99/38921 | 8/1999 | C09C/1/56 |
| WO | WO99/51690 | 10/1999 | C09B/69/00 |
| WO | WO00/22051 | 4/2000 | C09C/1/56 |
| WO | WO00/28386 | 5/2000 | G03G/9/09 |

OTHER PUBLICATIONS

International Search Report for PCT/US00/05742, mailed Jul. 31, 2000.

Database WPI, Section Ch, Week 198441, Derwent Publications Ltd., London, GB; Class E24, AN 1984–253429, XP002141963 & JP 59152960 A, published Aug. 31, 1984.

*Primary Examiner*—Anthony Green

(57) ABSTRACT

The present invention relates to a process for preparing surface-modified colored pigments. The process includes the steps of: preparing a reaction batch comprising a treating agent and a diazotizing agent; adding a colored pigment to the batch; and mixing the colored pigment and the batch under high shear conditions to form a reaction product comprising a surface-modified colored pigment. The treating agent has an organic group which comprises at least one diazotizable group. In a preferred embodiment the diazotizable group comprises a) at least one aromatic group or at least one $C_1$–$C_{20}$ alkyl group, and b) at least one ionic group, ionizable group, nonionic group, or a mixture thereof. The surface-modified colored pigments prepared by the process of the present invention have been found useful in aqueous or solvent based compositions and particularly in ink jet ink compositions.

35 Claims, No Drawings

PROCESS FOR PREPARING COLORED PIGMENTS

This application claims priority to U.S. Provisional Patent Application Ser. No. 60/122,941, filed on Mar. 5, 1999.

BACKGROUND OF THE INVENTION

1. Field of the Invention

The present invention relates to a process for preparing colored pigments and aqueous compositions containing the same and, more particularly, to preparing surface-modified colored pigments and ink compositions useful for imaging applications, such as ink jet inks.

2. Discussion of the Related Art

Aqueous systems are increasingly being used in many applications such as automotive and industrial coatings, paints, papers, inks, toners, adhesives, latexes, etc. as manufacturers face increased pressure to replace conventional solvent based systems. Such aqueous systems are known and generally contain a colorant, such as a dye, which is soluble in the aqueous vehicle, such as water or a mixture of water and a water-soluble or water-miscible organic solvent.

Although dye-based compositions are readily utilized, dyes have several disadvantages when used in aqueous ink systems. For example, dyes, being water-soluble in a water/organic mixture, may dissolve and run when exposed to moisture or water. Dye images may further smear or rub off on contact with felt pen markers or upon being rubbed or touched by a finger. Dyes also exhibit poor light stability when exposed to visible or ultraviolet light.

Pigments are also known as colorants in aqueous compositions but have not received a wide degree of acceptance in aqueous systems, such as ink jet inks, because of problems associated with the performance and reliability of the composition, i.e., print properties, stability, latency, and the like. Examples of such pigments include carbon black, titanium dioxide white, cobalt blue ($CoO-Al_2O_3$), phthalocyanine blue, phthalocyanine green, and chrome yellow ($PbCrO_4$).

U.S. Pat. No. 5,837,045, to Johnson et al. describes novel surface-modified colored pigments and aqueous compositions containing such surface-modified colored pigments. Although such surface-modified colored pigments are a considerable improvement over dye-based or traditional pigment systems (i.e. pigments requiring stabilization with a polymer or surfactant compositions), a continuing need exists for improved surface-modified colored pigments and processes for making the same, as well as aqueous or solvent based compositions containing such surface-modified colored pigments, especially for use in ink compositions which require long term colloidal stability and lightfastness. It is also desirable to produce improved aqueous ink compositions which exhibit improved latency and recoverability in their respective printing systems while providing good print properties. A further need exists for improved aqueous ink compositions which generate print images having improved waterfastness.

SUMMARY OF THE INVENTION

The present invention relates to a process for preparing surface-modified colored pigments. The process includes the steps of: preparing a reaction batch comprising a treating agent and a diazotizing agent; adding a colored pigment to the batch; and mixing the colored pigment and the batch under high shear conditions to form a reaction product comprising a surface-modified colored pigment. The treating agent has an organic group which comprises at least one diazotizable group. In a preferred embodiment the diazotizable group comprises a) at least one aromatic group, at least one $C_1-C_{20}$ alkyl group, or mixtures thereof; and b) at least one ionic group, ionizable group, nonionic group, or mixtures thereof.

The present invention is further directed to a process for preparing ink compositions incorporating the surface-modified colored pigments described above.

The surface-modified color pigments prepared by the process of the present invention may be used in aqueous or solvent based compositions containing conventional pigments. Such compositions include, for example, automotive and industrial coatings, printing plates, paints, papers, toners, inks (particularly, ink jet ink compositions), adhesives, latexes, textiles and fibers. The surface-modified colored pigments may be tailored to provide compatibility with the particular aqueous or solvent based system and provide easier, more complete dispersion, improved colloidal stability and greater color intensity and shades.

DETAILED DESCRIPTION OF THE PRESENT INVENTION

The present invention relates to a process for preparing surface-modified colored pigments. The process includes the steps of: preparing a reaction batch comprising a treating agent and a diazotizing agent; adding a colored pigment to the batch; and mixing the colored pigment and the batch under high shear conditions to form a reaction product comprising a surface-modified colored pigment.

The treating agent for use in the process of the present invention comprises an organic group which comprises at least one diazotizable group. For purposes of the present invention, a "diazotizable group" means a nitrogen containing compound which, in the presence of a diazotizing agent, will react to form a diazonium salt. The "diazotizing agent" means any compound which will donate a nitrogen atom during the reaction with the diazotizable group to form the diazonium salt. In a preferred embodiment the diazotizable group comprises a) at least one aromatic group, at least one $C_1-C_{20}$ alkyl group, and mixtures thereof; and b) at least one ionic group, ionizable group, nonionic group, and mixtures thereof.

A diazotizable group comprising at least one aromatic group includes, but is not limited to, unsaturated cyclic hydrocarbons containing one or more rings and may be substituted or unsubstituted, for example with alkyl groups. Aromatic groups include aryl groups (for example, phenyl, naphthyl, anthracenyl, and the like) and heteroaryl groups (for example, imidazolyl, pyrazolyl, pyridinyl, thienyl, thiazolyl, furyl, triazinyl, indolyl, and the like). A diazotizable group comprising at least one $C_1-C_{20}$ alkyl group may be branched or unbranched, substituted or unsubstituted. In a preferred embodiment, at least one aromatic group or at least one $C_1-C_{20}$ alkyl group of the diazotizable group is directly attached to the colored pigment.

A preferred set of diazotizable groups which may be used are organic groups substituted with an ionic group, an ionizable group or an nonionic group as a functional group. An ionizable group is one capable of forming a ionic group in the medium of use. The ionic group may be an anionic group or a cationic group and the ionizable group may form an anion or cation. The nonionic group is a group which does not possess or is not capable of possessing a charge.

Alternatively, the nonionic group may include a zwitterion (i.e. carrying both a positive and negative charge), thereby forming an overall neutral group.

Ionizable functional groups forming anions or anionic groups include, for example, acidic groups or salts of acidic groups. The organic groups, therefore, include groups derived from organic acids. Preferably, when an organic group contains an ionizable group forming an anion, such an organic group has a) an aromatic group or a $C_1$–$C_{20}$ alkyl group and b) at least one acidic group having a $pK_a$ of less than 11, or at least one salt of an acidic group having a $pK_a$ of less than 11, or a mixture of at least one acidic group having a $pK_a$ of less than 11 and at least one salt of an acidic group having a $pK_a$ of less than 11. The $pK_a$ of the acidic group refers to the $pK_a$ of the organic group as a whole, not just the acidic substituent. More preferably, the $pK_a$ is less than 10 and most preferably less than 9. Preferably, the aromatic group of the organic group is directly attached to the colored pigment. The aromatic group may be further substituted or unsubstituted, for example, with alkyl groups. More preferably, the organic group is a phenyl or a naphthyl group and the acidic group is a sulfonic acid group, a sulfinic acid group, a phosphonic acid group, or a carboxylic acid group. Most preferably, the organic group is a substituted or unsubstituted sulfophenyl group or a salt thereof; a substituted or unsubstituted carboxyphenyl group or a salt thereof; a substituted or unsubstituted (polysulfo)phenyl group or a salt thereof; a substituted or unsubstituted sulfonaphthyl group or a salt thereof; or a substituted or unsubstituted (polysulfo)naphthyl group or a salt thereof.

Examples of organic groups that are anionic in nature include, but are not limited to, —$C_6H_4$—$COO^-X^+$; —$C_6H_4$—$SO_3^-X^+$; —$C_6H_4$—$(PO_3)^{-2}2X^+$; —$C_6H_2$—$(COO^-X^+)_3$; —$C_6H_3$—$(COO^-X^+)_2$; —$(CH_2)_z$—$(COO^-X^+)$; —$C_6H_4$—$(CH_2)_z$—$(COO^-X^+)$; wherein $X^+$ is any cation such as $Na^+$, $H^+$, $K^+$, $NH_4^+$, $Li^+$, $Ca^{2+}$, $Mg^{2+}$ and the like and z is an integer from 1 to 18. As recognized by those skilled in the art, $X^+$ may be formed in-situ as part of the manufacturing process or may be associated with the aromatic or alkyl group through a typical salt swap or ion-exchange process.

Amines represent examples of ionizable functional groups that form cations or cationic groups and may be attached to the same groups as discussed above for the ionizable groups which form anions. For example, amines may be protonated to form ammonium groups in acidic media. Preferably, an organic group having an amine substituent has a $pK_b$ of less than 5. Quaternary ammonium groups (—$NR_3^+$), quaternary phosphonium groups (—$PR_3^+$) and sulfonium groups (—$SR_2^+$) also represent examples of cationic groups. Preferably, the organic group contains an aromatic group such as a phenyl or a naphthyl group and a quaternary ammonium or a quaternary phosphonium or sulfonium group. Quaternized cyclic amines, and even quaternized aromatic amines, can also be used as the organic group. Thus, N-substituted pyridinium compounds, such as N-methyl-pyridyl, can be used in this regard.

Examples of organic groups that are cationic in nature include, but are not limited to, —$C_6H_4N(CH_3)_3^+Y^-$, —$C_6H_4COCH_2N(CH_3)_3^+Y^-$, —$C_6H_4(NC_5H_5)^+Y^-$, —$(C_5H_4N)C_2H_5^+Y^-$, —$C_6H_4COCH_2(NC_5H_5)^+Y^-$, —$(C_5H_4N)CH_3^+Y^-$, and —$C_6H_4CH_2N(CH_3)_3^+Y^-$, wherein $Y^-$ is any halide or an anion such as $NO_3^-$, $OH^-$, $CH_3COO^-$ and the like; or combinations thereof. As recognized by those skilled in the art, $Y^-$ may be formed in-situ as part of the manufacturing process or may be associated with the aromatic or alkyl group through a typical salt swap or ion-exchange process.

Further examples of representative anionic and cationic based organic groups are also described in U.S. Pat. Nos. 5,571,311; 5,630,868; 5,707,432, and 5,803,959; PCT Publication No. WO 96/18688; and PCT Publication No. WO 96/18690, all hereby incorporated in their entirety by reference herein.

Further examples of the ionic or ionizable functional groups include amphiphilic counterions which may be cationic or anionic in nature. An amphiphilic counterion is a molecule or compound typically described as have a hydrophilic polar "head" and a hydrophobic "tail." Representative examples of cationic and anionic amphiphilic counterions include those set forth and described in U.S. Pat. No. 5,698,016 to Adams et al., the entire description of which is incorporated herein by reference.

For purposes of further illustrating the process of the present invention for preparing surface-modified colored pigments when an amphiphilic counterion is desired, it is understood that the surface-modified colored pigment, as described herein, has a cationic functionality (i.e. positive charge) or anionic functionality (negative charge). The charge preferably is created by the aromatic group or $C_1$–$C_{20}$ alkyl group of the diazotizable group attached to the pigment. If the desired surface-modified colored pigment is anionic in nature, then the amphiphilic counterion will be cationic or positive charging. Similarly, if the surface-modified colored pigment is cationic in nature, then the amphiphilic counterion will be anionic or negative charging.

Examples of cationic amphiphilic counterions include, but are not limited to, those described ammonium ions that may be formed from adding acids to the following: a fatty amine, an ester of an aminoalcohol, an alkylamine, a polymer containing an amine functionality, a polyethoxylated amine, a polypropoxylated amine, a polyethoxylated polypropoxylated amine, an aniline and derivatives thereof, a fatty alcohol ester of amino acid, a polyamine N-alkylated with a dialkyl succinate ester, a heterocyclic amine, a guanidine derived from a fatty amine, a guanidine derived from an alkylamine, a guanidine derived from an arylamine, an amidine derived from a fatty amine, an amidine derived from a fatty acid, an amidine derived from an alkylamine, or an amidine derived from an arylamine. The pKa of the ammonium ion is preferably greater than the pKa of the protonated form of the aromatic or alkyl group on the pigment.

Specific examples of cationic amphiphilic ions include dioctylammonium, oleylammonium, stearylammonium, dodecylammonium, dimethyldodecylammonium, stearylguanidinium, oleylguanidinium, soyalkylammonium, cocoalkylammonium, oleylammoniumethoxylate, protonated diethanolaminedimyristate, and N-oleyldimethylammonium. Preferred cationic amphiphilic ions include, ditallowalkylammonium, dimethyloleylammonium, cocoalkyldimethylammonium, and dimethylhydrogenated tallowalkylammonium. More preferred cationic amphiphilic ions include dicocoalkylammonium and dicyclohexylammonium. Generally, to form the ammonium ions described above, the various compounds described above such as fatty amines, esters of amino alcohols, etc., are reacted with an acid such as carboxylic acid, a mineral acid, an alkyl sulfonic acid, or an aryl sulfonic acid.

Quaternary ammonium salts can also be used as the sources of the cationic amphiphilic ion. Examples include, but are not limited to, a fatty alkyl trimethyl ammonium, a di(fatty alkyl)dimethylammonium, an alkyl trimethyl ammonium, or 1-alkyl pyridinium salt, where the counterion is a halide, methylsulfate, sulfonate, a sulfate or the like. Also, phosphonium salts, such as tetraphenylphosphonium chloride can be used as the sources of the amphiphilic ion.

Cationic amphiphilic ions for use in the present invention include those represented by the formula $R_4N^+$, wherein R is independently hydrogen, $C_1-C_{30}$ alkyl, $C_{1-C30}$ alkenyl, $C_7-C_{30}$ aralkyl, and $C_7-C_{30}$ alkaryl, 2-ethylhexylhydrogenated tallowalkylammonium, and dimethylditallowammonium.

Another example of a suitable amphiphilic ion is a polymer containing an ammonium ion derived from an amine containing polymer. The amine containing polymer can be a copolymer of an amine containing monomer, such as dimethylaminoethyl methacrylate or -acrylate, or vinylpyridine or vinylimidazole, and another monomer such as methyl acrylate, methyl methacrylate, butyl acrylate, styrene, and the like. The polymer may also be a ter- or tetra-polymer containing a mixture of an amine containing monomer and two or three other amine containing monomers, respectively. Such a polymer may be prepared by any means, such as radical (emulsion, suspension, or solution) or anionic polymerization.

As stated earlier, the amphiphilic counterion can alternatively be an anionic amphiphilic counterion. Examples of such anionic amphiphilic ions include, but are not limited to, an alkylbenzene sulfonate, an alkyl sulfonate, an alkylsulfate, a sulfosuccinate, a sarcosine, an alcohol ethoxylate sulfate, an alcohol ethoxylate sulfonate, an alkyl phosphate, an alkylethoxylated phosphate, an ethoxylated alkylphenol sulfate, a fatty carboxylate, a taurate, an isethionate, an aliphatic carboxylate, or an ion derived from a polymer containing an acid group. Sources of specific and preferred examples of anionic amphiphilic ions include, but are not limited to, sodium dodecylbenzene sulfonate, a sodium dodecylsulfate, Aerosol OT, an oleic acid salt, a ricinoleic acid salt, a myrisitic acid salt, a caproic acid salt, sodium 2-octyldodecanoate, sodium bis(2-ethylhexyl) sulfosuccinate, a sulfonated polystyrene, or homo- or copolymers of acrylic acid or methacrylic acid or salts thereof.

Generally, the above-identified amphiphilic counterions and related compounds are commercially available in salt form or can be routinely made by one of ordinary skill in the art.

Nonionic groups may include, but are not limited to, hydrophilic groups, hydrophobic groups, alkyl and aryl groups, ethers, polyethers, alkyls, fluorinated alkyls and the like.

Typically, the diazotizing agent is any metal or organic nitrite including, for example, ammonium nitrite, butyl nitrite, dicyclohexylammonium nitrite, ethylnitrite, isoamylnitrite, lithium nitrite, sodium nitrite, potassium nitrite, or zinc nitrite, and may also include nitrous acid, nitrogen oxide, nitrogen dioxide, and mixtures of any one of these.

As a first step in the process of the present invention, a reaction batch is prepared by mixing the desired treating agent in a liquid reaction medium. Preferably, the mixing occurs for a sufficient amount of time to substantially dissolve the treating agent. A preferred liquid reaction medium includes water, any medium containing water, any medium containing alcohols, and mixtures thereof. A water based reaction medium is most preferred. A batch of the diazotizing agent, such as sodium nitrite, typically dissolved in the same medium as the treating agent, is then added to the treating agent batch and mixed under suitable conditions sufficient to form a diazonium salt. Alternatively, both the treating agent and the diazotizing agent may be simultaneously added to the liquid medium and mixed under suitable conditions. Again the mixing preferably occurs for a sufficient amount of time to substantially dissolve both agents in the liquid medium and form a diazonium salt.

The desired colored pigment is then added to the reaction batch in a second step and is continuously mixed with the reaction batch under high shear conditions for a sufficient amount of time to form a reaction product comprising a surface-modified colored pigment.

The desired colored pigment may be chosen from a wide range of conventional colored pigments. The colored pigment can be blue, black, brown, cyan, green, violet, magenta, red, yellow, as well as mixtures thereof. Suitable classes of colored pigments include, for example, anthraquinones, phthalocyanine blues, phthalocyanine greens, diarylides, disazo condensations, monoazos, pyranthrones, perylenes, quinophthalone, isoindoline, benzimidazolone, naphthol-AS, beta-naphthol, triaryl carbonium, diketopyrrolo-pyrrole (DPP), indanthrone, aniline black, quinacridones, and (thio)indigoids. Representative examples of phthalocyanine pigments include copper phthalocyanine blue and green and derivatives thereof (Pigment Blue 15 and Pigment Green 7 and 36). Other examples of phthalocyanine pigments are Pigment Blue 16 and other metal (aluminum, iron, etc.) phthalocyanine pigments. Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red), Pigment Yellow 99, Pigment Yellow 123, and Pigment Black 20. Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224, Pigment Black 31, and Pigment Black 32. Representative examples of thioindigoids include Pigment Red 86, Pigment Red 87, Pigment Red 88, Pigment Red 181, Pigment Red 198, Pigment Violet 36, and Pigment Violet 38. Representative examples of monoazos, diarylides, and disazo condensations include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 83, Pigment Yellow 128, Pigment Yellow 183, Pigment Orange 1, Pigment Orange 6, Pigment Red 220, Pigment Red 242, and Pigment Brown 41. Representative example of quinophthalone pigments is Pigment Yellow 138. Representative examples of isoindoline pigments are Pigment Yellow 139, Pigment Yellow 185, and Pigment Orange 61. Representative examples of benzimidazolone pigments are Pigment Yellow 151, Pigment Yellow 180, Pigment Yellow 194 and Pigment Red 208. Representative examples of naphthol-AS pigments are Pigment Red 14, Pigment Red 15, Pigment Red 95, Pigment Red 112, Pigment Red 119, Pigment Red 146, Pigment Red 184, Pigment Red 188, Pigment Red 238, Pigment Red 266, Pigment Orange 22, Pigment Orange 24, and Pigment Violet 13. Representative examples of beta-naphthol pigments are Pigment Red 49, Pigment Red 53, and Pigment Orange 17. Representative examples of triaryl carbonium pigments are Pigment Red 81, Pigment Violet 1, Pigment Brown 1, Pigment Blue 1, Pigment Blue 2 and Pigment Blue 10. Representative examples of DPP pigments are Pigment Orange 71, Pigment Orange 73, Pigment Red 254, Pigment Red 255, Pigment Red 264, and Pigment Red 272. Representative examples of indanthrone pigments are Pigment Blue 60 and Pigment Blue 64. Representative example of aniline black is Pigment Black 1. Such pigments are commercially available in either powder or press cake form from a number of sources including, BASF Corporation, Engelhard Corporation and Sun Chemical Corporation. Examples of other suitable colored pigments are described in the *Colour Index*, 3rd edition (The Society of Dyers and Colourists, 1982). Representative examples of black pigments include various carbon blacks (Pigment Black 7) such as channel blacks, furnace blacks and lamp blacks, and include, for example, carbon blacks sold under the Regal®, Black Pearls®, Elftx® ®, Monarch®, Mogul®, and Vulcan® trademarks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® L, Elftex® 8, Monarch® 1400, Monarch® 1300, Monarch® 1100, Monarch® 1000, Monarch® 900, Monarch® 880, Monarch® 800, Monarch® 700, Mogul® L, Regal® 330, Regal® 400, Vulcan® P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation. The color pigment will typically have a wide range of BET surface areas, as measured by nitrogen adsorption. Preferably, the colored pigment has a surface area equal or greater than 85 $m^2/g$, and more preferably equal or greater than 100 $m^2/g$, thereby corresponding to a smaller primary/aggregate particle size. Such surface areas have been found to provide for a more uniform distribution and efficient level of treating agent on the surface of the pigment and a higher percent yield of the surface-modified colored pigment after post processing techniques. If the preferred higher surface area of the colored pigment (thereby corresponding to a smaller particle size) is not readily available, it is well recognized by those skilled in the art that the colored pigment may be subjected to conventional size comminution or reduction techniques, such as ball or jet milling, to reduce the pigment to the desired particle size.

As noted above, the desired colored pigment is then added to the reaction batch in a second step and is continuously mixed with the reaction batch under high shear conditions for a sufficient amount of time to form a reaction product comprising a surface-modified colored pigment. In a preferred embodiment, the mixing takes place in a suitable vessel under high shear conditions and utilizes equipment capable of providing a continued particle size reduction and may, for example, include equipment capable of providing a grinding, impact, or similar impingement action, such as horizontal media mills, vertical media mills such as attritors, ball mill, hammer mills, pin disk mills, fluid energy mills, jet mills, fluid jet mills, impingement jet mills, rotostators, pelletizers, homogenizers, sonicators, cavitators, and the like. For purposes of this invention, "high shear" means an energy sufficient to reduce the particle size distribution of the colored pigment to a desired size and continually expose new surfaces of the colored pigment to the reaction batch, thereby improving the distribution and level of the treating agent being attached to the surface of the colored pigment and the overall product yield. Preferably, the same vessel is used in the high shear mixing step as that used to prepare the reaction batch of treating agent and diazotizing agent. In addition, the vessel may be preferably equipped with suitable means for adding heat, such as a heating mantle, thermocouple and the like.

Typically, the high shear mixing will occur at a temperature ranging from about 0° C. and 90° C. for a time period between 30 minutes and 48 hours. Preferably, the high shear mixing takes place at a temperature ranging from about 50° C. and 75° C. for a time period between 1 hour and 24 hours because such a range has been found to produce a surface-modified colored pigment with improved dispersibility, stability and color intensity. In a most preferred embodiment, one or more additional or staged increments of the treating agents and the diazotizing agent may be added to the vessel to provide maximum reaction efficiency and uniform treatment of the treating agent on the surface of the colored pigment. In other words, the predetermined amount of treating agent and diazotizing agent (as calculated to achieve the desired attachment level of treating agent), is introduced into the vessel in two or more staged increments, as opposed to all at once. The overall amount of treating agent added to provide the surface modification to the colored pigment is sufficient to achieve colloidal stability of the surface-modified colored pigment in a particular composition, as well as to improve any particular property, such as waterfastness, of the desired end product application. When low levels of treating agent are desired, it has been found that the diazotizable/organic group is typically introduced (i.e. present in the reaction batch) at a level from about 0.01 to 5.0 micromoles/$m^2$ of the colored pigment used, based upon the nitrogen surface area of the colored pigment. When traditional levels of treating agent are desired, it has been found that the diazotizable/organic group is typically introduced (i.e. present in the reaction batch) at a level from about 5.0 to 50.0 micromoles/$m^2$ of the colored pigment used, based upon the nitrogen surface area of the colored pigment. Lastly, it will be appreciated by those skilled in the art that the pH of the reaction mixture may be varied depending on the particular treating agent and the most efficient reaction conditions and may, for example, be at an acidic or neutral pH as appropriate.

Dispersions of the surface-modified color pigment prepared by the process of the present invention may be further purified or classified to remove impurities and other undesirable free species which can co-exist in the dispersion as a result of the manufacturing process. In a preferred embodiment, the surface-modified color pigment dispersions prepared by the process of the present invention are subjected to a classification step, such as centrifugation, to substantially remove particles having a size above about 1.0 micron, preferably above about 0.5 micron. In addition, the dispersion is preferably purified to remove any undesired free species, such as unreacted treating agents, reaction by-products, or raw material impurities. Known techniques of ultrafiltration/diafiltration using a membrane or ion exchange may be used to purify the dispersion and remove a substantial amount of free ionic and unwanted species. Alternatively an acid wash, dialysis or a concentration (de-watering) step may be utilized to purify the dispersion. Also preferred is an optional exchange of counterions whereby the counterions that form a part of the surface-modified color pigment are exchanged or substituted with alternative counterions utilizing known ion exchange techniques such as ultrafiltration, reverse osmosis, ion exchange columns and the like. Particular examples of counterions that can be exchanged include, but are not limited to, $Na^+$, $K^+$, $Li^+$, $NH_4^+$, $Ca^{2+}$, $Mg^{2+}$, $Cl^-$, $NO_3^-$, $NO_2^-$, acetate, carboxylate, and $Br^-$. Such additional classification and purification methods are more fully described in U.S. patent application Ser. No. 09/240,291, filed Jan. 29, 1999, the disclosure of which is fully incorporated herein by reference.

The surface-modified color pigment prepared by the process of the present invention may be used in aqueous or solvent based compositions containing conventional pigments. The following discussion relating to ink compositions is similarly applicable to other liquid systems including, for example, coatings, papers, inks, toners, adhesives, latexes, textiles and fibers.

Ink compositions containing the surface-modified colored pigment prepared by the process of the present invention have been found suitable for use in imaging applications, particularly for use in ink jet inks. Such ink and ink jet compositions exhibit improved formulation properties and storage stability. In addition, images generated from such ink and ink jet compositions exhibit good waterfastness and color intensity.

The surface-modified colored pigment prepared by the process of the present invention is present in the aqueous or solvent based ink or ink jet composition in an amount effective to provide the desired image quality, e.g., optical density, without detrimentally affecting the performance of the ink. Typically, the surface-modified colored pigments will be present in an amount ranging from about 1% to about 20%, preferably from about 2% to about 10%, based on the weight of the ink composition. In addition, the surface-modified colored pigment is typically as small as possible to enable a stable colloidal suspension of the pigment in the liquid vehicle and to prevent clogging of the ink channels and nozzles when used in the desired printing application. For example, a preferred average particle size of the surface-modified colored pigment for use in a thermal ink jet printer are generally below 1.0 micron, preferably in a range from about 0.005 micron to about 0.3 micron.

The ink compositions of the present inventions may be prepared utilizing conventional techniques known to those skilled in the art, such as combining or mixing the desired component in a suitable aqueous or solvent based medium. When the ink and ink jet compositions are aqueous based systems, a significant amount of water, preferably deionized or distilled water, is typically used. For example, the amount of water or similar medium is generally present in an amount ranging from about 50% to about 95%, preferably from about 60% to 80%, based on the weight of the ink or inkjet composition.

The ink and ink jet compositions of the present invention may be buffered to the desired pH by the addition of a suitable base, such as sodium hydroxide, ammonium hydroxide, triethylamine, dimethylethanolamine and the like, or a suitable acid, such as mineral acids, hydrochloric acid, sulfuric acid and the like. In addition, a polymer which is soluble in the ink composition may be added to improve the waterfastness of the images generated from the ink compositions. These polymers include, for example, polyvinyl alcohol, polyester, polyestermelamine, styrene-acrylic acid copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl napthalene-acrylic acid copolymers, vinyl napthalene-maleic acid copolymers and salts thereof. Additional polymers include polyvinylimidazole, derivatives of polyvinylimidazole, copolymers of vinylimidazole, copolymers of vinylimidazole derivatives, polyvinylpyridine, derivatives of polyvinylpyridine, copolymers of vinylpyridine, copolymers of vinylpyridine derivatives, polyethyleneimine, derivatives of polyethyleneimine, and mixtures thereof, as described in PCT Publication No. WO 96/18688, the disclosure of which is fully incorporated herein by reference.

Suitable additives are also generally incorporated into the ink or ink jet composition to impart a number of desired properties while maintaining the stability of the compositions. For example, a surfactant or suitable polymer may be used to further enhance the colloidal stability of the colored pigment in the ink composition. Other additives are well known in the art and include humectants, biocides, binders, drying accelerators, penetrants and the like. Examples of humectants include ethylene glycol, propylene glycol, diethylene glycol, glycerine, dipropylene glycol, polyethylene glycol, polypropylene glycol, alkane diols, amides, ethers, carboxylic acids, esters, alcohols, organosulfides, organosulfoxides, sulfones, alcohol derivatives, 2-pyrrolidone, ether derivatives, amino alcohols, and ketones. The amount of a particular additive will vary depending on a variety of factors but are generally present in an amount ranging between 0% and 40%, preferably between 0.1% and 10%, although the amount may be outside this range.

Printed images may be generated from the ink or ink jet compositions of the present invention by incorporating such compositions into a suitable printing apparatus, and generating an image onto a substrate. Suitable ink jet printers include, for example, thermal printers, piezoelectric printers, continuous printers, valve printers and the like. Similarly, any suitable substrate can be employed including plain papers, bonded papers, coated papers, transparency materials, textile materials, plastics, polymeric films, inorganic substrates and the like.

As noted above, the surface-modified colored pigments prepared by the process of the present invention may be used in other aqueous or solvent based systems including, but not limited to, coatings, paints, papers, adhesives, latexes, toners, textiles and fibers. For example, the aqueous or solvent based systems may be prepared by combining or mixing the surface-modified colored pigment with suitable resins, such as alkyds, acrylics, polyesters, silicates, urethanes, epoxies and the like.

Non-limiting illustrations of the present invention follow.

EXAMPLE 1

Preparation of a Surface-Modified Colored Pigment

Six hundred and fifty grams (650 g) of ceramic grinding media having an average diameter of 2 mm (available from CB Mill, Gurnee, Ill.) and 260 mL of deionized water were added to a 500 mL attritor equipped with a heating mantle (available from Union Process, Akron, Ohio). The attritor was heated to 60° C. and operated at a speed of 440 rpm. Sulfanilic acid (6.76 grams), available from Aldrich Chemical, Milwaukee, Wis.), was then added to the attritor and allowed to grind with the ceramic media for approximately 30 minutes until substantially all of the sulfanilic acid was dissolved. A batch consisting of 2.73 grams of sodium nitrite (available from Aldrich Chemical, Milwaukee, Wis.) dissolved in 20.0 grams of deionized water was then added to the attritor. Immediately following addition of the sodium nitrite batch, 30 grams of copper phthalocyanine blue (Pigment Blue, Sunfast 15:4, Colour Index (CI) #74160, available from Sun Chemical, Cincinnati, Ohio) having a surface area of 130 m$^2$/g was added to the attritor. The resulting mixture was allowed to react for approximately 1 hour before 6.76 grams of additional sulfanilic acid was added, followed by 2.73 grams of additional sodium nitrite. The mixture was then allowed to react for approximately 5 hours at 60° C. at an attritor speed of 440 rpm. The resulting product was a water dispersible surface-modified blue pigment having $C_6H_4SO_3^-Na^+$ groups. The product was then subjected to post treatment processing techniques which included filtering the product through a 20 μm screen and further subjecting the filtered product to ultrafiltration (as commonly referred to as diafiltration) using a Pall SLP1053 Module Filter System (available from Pall Filtron Corporation, Northborough, Mass.) until the permeate was colorless. The surface-modified blue pigment dispersion was then centrifuged to substantially remove any pigment particles having a particle size above 0.35 μm. The overall yield of the dispersion after centrifugation was 60% by weight based on the blue pigment.

Sulfur and nitrogen was determined by a combustion technique using a Fissions EA-1108 gas chromotographer as an indicator of the amount or level of chemical attachment of the treating agent to the surface of the colored pigment. In addition, particle size distributions were measured using a MICROTRAC® Ultrafine Particle Analyzer (available from Honeywell, Minneapolis, Mich.). The following conditions were used: non-transparent, non-spherical particles; particle density 1.86 g/m$^3$; water as the dispersing liquid; a run time of six minutes. For comparative purposes, the sulfur content, nitrogen content and particle size distribution was also determined for the untreated Sunfast Blue 15:4 pigment.

The sulfur content, nitrogen content and particle size distribution of the surface-modified blue pigment made in accordance with the process of the present invention and the untreated blue pigment are illustrated in Table 1.

TABLE 1

| (g. Sulfanilic Acid/g Sunfast Blue 15:4 Pigment) x 100%* | Sulfur Content (%)** | Nitrogen Content (%)† | Particle Size Distribution (μm)□ | |
|---|---|---|---|---|
| | | | 95% less than (max) | 50% less than (mean) |
| 0 (Untreated) | 0.2 | 18.7 | 1.115 | 0.3512 |
| 45 (Treated) | 1.23 | 17.7 | 0.3785 | 0.1381 |

*Ratio of the amounts of added sulfanilic acid to pigment in weight percent.
**Resultant sulfur content in weight percent after dia-filtration and centrifugation.
†Resultant nitrogen content in weight percent after dia-filtration and centrifugation.
□The Particle Size Distributions was determined directly after treatment based on weight or volume percentage prior to dia-filtration and centrifugation. The particle size of the untreated Sunfast Blue 15:4 Pigment was determined from a 0.1% by weight of aqueous dispersion of pigment with 0.7% by weight of Tween 80 dispersing agent (available from Aldrich Chemical, Milwaukee, Wisconsin).

As shown in Table 1, the addition of the sulfanilic acid with sodium nitrite utilizing the process of the present invention resulting in the formation of a surface-modified blue pigment having $C_6H_4SO_3^-Na^-$ groups, as noted in the increase in sulfur content. The ability to achieve a mean particle size less than 0.5 μm and maximum particle size less than 1.0 μm also correlates to a more uniform and efficient treatment process. In addition, the yield of the surface-modified colored pigment after ultrafiltration and centrifugation was dramatically improved by utilizing the process of the present invention.

The surface-modified blue pigment prepared by the process of the present invention was readily dispersible in an aqueous medium and exhibited good color shade and intensity. The untreated pigment, on the other hand, was very difficult to disperse in water, and agglomerated, i.e. clumped, upon standing in a short period of time.

EXAMPLE 2

Preparation of a Surface-Modified Colored Pigment

A surface-modified phthalocyanine blue pigment was prepared by repeating the procedure of Example 1, except that the amount of sulfanilic acid was 3.16 grams at the first addition (prior to pigment introduction) and 3.16 grams at the second addition (after pigment introduction) and the amount of sodium nitrite was 1.26 grams at the first addition (prior to pigment introduction) and 1.26 grams at the second addition (after pigment introduction), respectively. In addition, the colored pigment was phthalocyanine blue (Pigment Blue, Zulu 4960, Colour Index (CI) #74160, available from Engelhard, Beachwood, Ohio) having a surface area of 60 m$^2$/g was used. The resulting product was a surface-modified blue pigment having $C_6H_4SO_3^-Na^+$ groups. The product was then filtered through a 20 μm screen and subjected to the ultrafiltration step set forth in Example 1. The surface-modified blue pigment dispersion was then centrifuged to substantially remove any pigment particles having a particle size above 0.35 μm. The overall yield of the dispersion after centrifugation was 13% by weight based on the blue pigment.

The particle size distribution of the surface-modified color pigment is illustrated as in Table 2.

TABLE 2

| Surface-Modified Colored Pigment | Particle Size Distribution (μm)□ | |
|---|---|---|
| | 95% less than (max) | 50% less than (mean) |
| Example 2 | 1.356 | 0.4780 |

□The Particle Size Distributions were determined directly after treatment utilizing the conditions provided in Example 1.

Similar to Example 1, the surface-modified blue pigment prepared by the process of the present invention was readily dispersible in an aqueous medium and exhibited good color shade and intensity. It is recognized, however, that in order to improve the yield of the surface-modified colored pigment after the post treatment processing techniques of ultrafiltration and centrifugation are performed, a colored pigment having a larger surface area (as in Example 1) may be used or, alternatively, the colored pigment may be subjected to a conventional size reduction step to reduce the particle size prior to or during to the addition of the reaction batch including the treating agent and the diazotizing agent.

EXAMPLE 3

Preparation of a Surface-Modified Colored Pigment

A surface-modified phthalocyanine blue pigment was prepared by repeating the procedure of Example 1, except that the amount of sulfanilic acid was 2.71 grams at the first addition (prior to pigment introduction) and 2.71 grams at the second addition (after pigment introduction) and the amount of sodium nitrite was 1.08 grams at the first addition (prior to pigment introduction) and 1.08 grams at the second addition (after pigment introduction), respectively. The resulting product was a surface-modified blue pigment having $C_6H_4SO_3^-Na^+$ groups. The product was then filtered through a 20 µm screen and subjected to the ultrafiltration step set forth in Example 1. The surface-modified blue pigment dispersion was then centrifuged to substantially remove any pigment particles having a particle size above 0.35 µm. The overall yield of the dispersion after centrifugation was 40% by weight based on the blue pigment.

The particle size distribution of the surface-modified color pigment is illustrated as in Table 3.

TABLE 3

| Surface-Modified Colored | Particle Size Distribution (µm)[a] | |
| --- | --- | --- |
| Pigment | 95% less than (max) | 50% less than (mean) |
| Example 3 | 0.6893 | 0.2408 |

[a]The Particle Size Distributions were determined directly after treatment utilizing the conditions provided in Example 1.

Similar to Example 1, the surface-modified blue pigment prepared by the process of the present invention was readily dispersible in an aqueous medium and exhibited good color shade and intensity. It is recognized, however, that in order to improve the yield of the surface-modified colored pigment after the post treatment processing techniques of ultrafiltration and centrifugation are performed, increased amounts of the treating agent and diazotizing agent (either as the first or second addition, or as an additional staged addition) are preferable.

EXAMPLE 4

Preparation of a Surface-Modified Colored Pigment

A surface-modified phthalocyanine blue pigment was prepared by repeating the procedure of Example 1, except that 5.34 grams p-amino-benzoic acid at the first addition (available from Aldrich Chemical, Milwaukee, Wis.) and 5.34 grams at the second addition was used as the treating agent instead of sulfanilic acid. The resulting product was a surface-modified blue pigment having $C_6H_4CO_2^-Na^+$ groups. The product was then filtered through a 20 µm screen and subjected to the ultrafiltration step set forth in Example 1. The surface-modified blue pigment dispersion was then centrifuged to substantially remove any pigment particles having a particle size above 0.35 µm. The overall yield of the dispersion after centrifugation was 20% by weight based on the blue pigment.

The particle size distribution of the surface-modified color pigment is illustrated as in Table 4.

TABLE 4

| Surface-Modified Colored | Particle Size Distribution (µm)[a] | |
| --- | --- | --- |
| Pigment | 95% less than (max) | 50% less than (mean) |
| Example 4 | 1.020 | 0.3704 |

[a]The Particle Size Distributions were determined directly after treatment utilizing the conditions provided in Example 1.

Similar to Example 1, the surface-modified blue pigment prepared by the process of the present invention was readily dispersible in an aqueous medium and exhibited good color shade and intensity. It is recognized, however, that in order to improve the yield of the surface-modified colored pigment after the post treatment processing techniques of ultrafiltration and centrifugation are performed, a colored pigment having a larger surface area may be used or, alternatively, the colored pigment may be subjected to a conventional size reduction step to reduce the particle size prior to addition of the reaction batch of the treating agent and the diazotizing agent. In addition, increased amounts of the treating agent and diazotizing agent (either as the first or second addition, or as an additional staged addition) may be preferable.

EXAMPLE 5

Preparation of a Surface-Modified Colored Pigment

Six hundred and fifty grams (650 g) of ceramic grinding media having an average diameter of 2 mm (available from CB Mill, Gurnee, Ill.) and 260 mL of de-ionized water were added to a 500 mL attritor equipped with a heating mantle (available from Union Process, Akron, Ohio). The attritor was heated to 60° C. and operated at a speed of 440 rpm. Sulfanilic acid (2.90 grams), available from Aldrich Chemical, Milwaukee, Wis.), was then added to the attritor and allowed to grind with the ceramic media for approximately 30 minutes until substantially all of the sulfanilic acid was dissolved. A batch consisting of 1.16 grams of sodium nitrite (available from Aldrich Chemical, Milwaukee, Wis.) dissolved in 20.0 grams of deionized water was then added to the attritor. Immediately following addition of the sodium nitrite batch, 30 grams of Magenta 122 Pigment (Sunfast Red 122, Colour Index (CI) #73915, available from Sun Chemical, Cincinnati, Ohio) having a surface area of 60 m²/g was added to the attritor. The resulting mixture was allowed to react for approximately 1 hour before 2.2 grams of additional sulfanilic acid was added, followed by 0.87 grams of additional sodium nitrite. The mixture was then allowed to react for approximately 1 hour at 60° C. at an attritor speed of 440 rpm before 2.2 grams of additional sulfanilic acid was added, followed by 0.87 grams of sodium nitrite. The mixture was then allowed to react for approximately 5 hours at 60° C. at an attritor speed of 440 rpm. The resulting product was a surface-modified magenta pigment having $C_6H_4SO_3^-Na^+$ groups. The product was then filtered through a 20 µm screen and subjected to the ultrafiltration step set forth in Example 1. The surface-modified magenta pigment dispersion was then centrifuged to substantially remove any pigment particles having a particle size above 0.35 µm. The overall yield of the dispersion after centrifugation was 35% by weight based on the magenta pigment.

The particle size distribution of the surface-modified color pigment is illustrated as in Table 5.

TABLE 5

| Surface-Modified Colored | Particle Size Distribution (µm)[a] | |
| --- | --- | --- |
| Pigment | 95% less than (max) | 50% less than (mean) |
| Example 5 | 0.9917 | 0.5604 |

[a]The Particle Size Distributions were determined directly after treatment utilizing the conditions provided in Example 1.

Similar to Example 1, the surface-modified magenta pigment prepared by the process of the present invention was readily dispersible in an aqueous medium and exhibited good color shade and intensity. It is recognized, however, that in order to improve the yield of the surface-modified colored pigment after the post treatment processing techniques of ultrafiltration and centrifugation are performed, a colored pigment having a larger surface area (as in Example 1) may be used or, alternatively, the colored pigment may be subjected to a conventional size reduction step to reduce the particle size prior to addition of the reaction batch of the treating agent and the diazotizing agent.

COMPARATIVE EXAMPLE 6

Preparation of a Surface-Modified Colored Pigment

Six hundred and fifty grams (650 g) of ceramic grinding media having an average diameter of 2 mm (available from CB Mill, Gurnee, Ill.) and 260 mL of de-ionized water were added to a 500 mL attritor equipped with a heating mantle (available from Union Process, Akron, Ohio). The attritor was heated to 60° C. and operated at a speed of 440 rpm. In comparison to Example 1, wherein the attritor was first charged with a batch of treating agent and diazotizing agent, 30 grams of copper phthalocyanine blue (Pigment Blue, Sunfast 15:4, Colour Index (CI) #74160, available from Sun Chemical, Cincinnati, Ohio) having a surface area of 130 $m^2/g$ was added to the attritor, then followed by 6.76 grams of sulfanilic acid. The pigment/sulfanilic acid mixture was allowed to grind with the ceramic media for approximately 30 minutes until substantially all of the sulfanilic acid was dissolved. A batch consisting of 2.73 grams of sodium nitrite (available from Aldrich Chemical, Milwaukee, Wis.) dissolved in 20.0 grams of deionized water was then added to the attritor. The resulting mixture was allowed to react for approximately 1 hour before 6.76 grams of additional sulfanilic acid was added, followed by 2.73 grams of additional sodium nitrite. Similar to Example 1, the mixture was then allowed to react for approximately 5 hours at 60° C. at an attritor speed of 440 rpm, however 6.67 grams of additional sulfanilic acid was added, followed by 2.73 grams of additional sodium nitrite. The mixture was further allowed to react overnight. The resulting product was a surface-modified blue pigment having $C_6H_4SO_3^-Na^+$ groups. The product was then filtered through a 20 μm screen and subjected to the ultrafiltration step set forth in Example 1. The surface-modified blue pigment dispersion was then centrifuged to substantially remove any pigment particles having a particle size above 0.35 μm. The overall yield of the dispersion after centrifugation was only 35% by weight based on the blue pigment, as compared to a yield of 60% utilizing the process of the present invention.

The particle size distribution of the surface-modified color pigment is illustrated as in Table 6.

TABLE 6

| Surface-Modified Colored Pigment | Particle Size Distribution (μm)[a] | | |
|---|---|---|---|
| | 95% less than (max) | 50% less than (mean) | Yield |
| Example 1 | 0.3785 | 0.1381 | 60% |
| Comparative Example 6 | 0.8119 | 0.2528 | 35% |

[a]The Particle Size Distributions were determined directly after treatment utilizing the conditions provided in Example 1.

The particle size distribution of the surface-modified color pigment, as compared to Example 1, is illustrated as Table 6. As compared to the process of the present invention described in Example 1, the conventional process used in Example 6 was not as efficient as indicated by the larger particle size distribution (especially at 95%) and the significantly lower yield of the surface-modified colored pigment after post treatment processing.

COMPARATIVE EXAMPLE 7

Preparation of a Surface-Modified Colored Pigment

One hundred (100) mL of de-ionized water was added to a 600 mL glass beaker on a hot plate equipped with a mechanical stirrer. The water was heated to 60° C. and stirred at a speed of 450 rpm. Sulfanilic acid (2.1 grams), available from Aldrich Chemical, Milwaukee, Wis.), was then added to the beaker and allowed to stir approximately 30 minutes until substantially all of the sulfanilic acid was dissolved. A batch consisting of 0.83 grams of sodium nitrite (available from Aldrich Chemical, Milwaukee, Wis.) dissolved in 10.0 grams of deionized water was then added to the beaker. Immediately following the addition of the sodium nitrite batch, 5.0 grams of phthalocyanine blue (Pigment Blue, Zulu 4960, Colour Index (CI) #74160, available from Engelhard Corporation, Beachwood, Ohio) having a surface area of 60 $m^2/g$ was added to the beaker. The resulting mixture was allowed to react for approximately 6 hours at 60° C. at a stirrer speed of 450 rpm. The resulting product was a surface-modified blue pigment having $C_6H_4SO_3^-Na^+$ groups. The product was then filtered through a 20 μm screen and subjected to the ultrafiltration step set forth in Example 1. The surface-modified blue pigment dispersion was then centrifuged to substantially remove any pigment particles having a particle size above 0.35 μm. The overall yield of the dispersion after centrifugation was less than 10% by weight based on the blue pigment.

The particle size distribution of the surface-modified colored pigment is illustrated as in Table 7.

TABLE 7

| Surface-Modified Colored Pigment | Particle Size Distribution (μm)[a] | |
|---|---|---|
| | 95% less than (max) | 50% less than (mean) |
| Comparative Example 7 | 4.184 | 1.31 |

[a]Particle Size Distributions were determined directly after treatment utilizing the conditions provided in Example 1.

The particle size distribution of the surface-modified color pigment is illustrated as Table 7. As compared to the process of the present invention described in Example 1, the conventional process described in Example 7 was not as efficient as indicated by the larger particle size distribution (especially at 95%) and the significantly lower yield of the surface-modified colored pigment after post treatment processing. In addition, the surface-modified colored pigment formed a substantial layer of pastelike material which had to be scrapped from the 20 μm screen. The product was not suitable for incorporation into an aqueous medium.

EXAMPLE 8

Dispersion Stability Tests of a Surface-Modified Colored Pigment

The surface-modified colored pigment of Example 1 (after centrifugation) was concentrated to 4.1% solid content by ultrafiltration. Ten (10) mL of the concentrated dispersion was added to a 20 mL glass vial. The vial was capped and placed in an oven (available from VWR Scientific Product, Willard, Ohio) and heated at 70° C. for seven days. The particle size distribution of the surface-modified color pigment, both before (Example 8A) and after aging (Example 8B) is illustrated in Table 8. As indicated in Table 8, the 4.1% concentration of the surface-modified blue pigment made by the process of the present invention exhibited a high level of colloidal stability, even after aging.

TABLE 8

| Surface-Modified Colored | Particle Size Distribution (μm)[a] | |
|---|---|---|
| Pigments | 95% less than (max) | 50% less than (mean) |
| Example 8A | 0.1351 | 0.0763 |
| Example 8B | 0.1450 | 0.0766 |

[a]The Particle Size Distributions were determined after the post treatment processing steps of ultrafiltration and centrifugation.

EXAMPLE 9

Preparation of an Ink

The surface-modified colored pigment of Example 1 (after centrifugation) was added to distilled water to form an aqueous dispersion at a 8.5% loading level, by weight, of pigment. The dispersion was formulated into an ink jet ink having the following components, by weight: 3% surface-modified Sunfast 15:4 Blue Pigment, 7.5% ethylene glycol, 7.5% glycerol and 4.0% iso-propanol and the remainder distilled water.

The resultant ink was used to generate blue print on a standard paper set (Xerox 4024, Fox Bond, KG) and one transparency using a Canon Bubblejet 4200 printer with a BCI-21 cartridge. Tristimulus, waterfastness (WF), and optical density (OD) results are illustrated in Table 9. For comparison purposes, corresponding results from a factory supplied Canon BCI-21 blue dye is also included in Table 9. For additional comparison, pigment based ENCAD GO Graphic Outdoor Ink (available from ENCAD, San Diego, Calif.), was also subjected to the same test, and the results are shown in Table 9.

Tristimulus color values, L*, a*, and b*, were determined using a Hunter Lab Scan II instrument (available from Hunter Associates Laboratory, Inc. Reston, Va.). Optical Density (OD) was determined by Macbeth Densitometer RD 915S (available from GretagMacbeth LLC, New Windsor, N.Y.) following ANSI Procedure CGATS,4-1993. Waterfastness (WF) was determined by first hanging the print out at an approximately 45° angle, squirting 25 mL of water at predetermined time intervals (1 minute after printing, 5 minutes after printing, etc.) and observing any color runoff. The print was considered to be waterfast at the point in time when the runoff from the water squirt was clear.

As compared to the two commercially available color ink products identified above, the results in Table 9 indicate that the surface modified blue pigment prepared by the process of the present invention, in an un-optimized ink jet ink formulation, exhibited good printing ability and waterfastness on two type of papers.

TABLE 9

| | | Comparative Example Canon BCI-21- Blue | Ink Composition of Example 11 | Comparative Example ENCAD GO Graphic Outdoor Ink |
|---|---|---|---|---|
| Xerox 4024 Paper | WF | >24 hours | >24 hours | >24 hours |
| | OD | 1.19 | 0.89 | 1.09 |
| | L* | 54.99 | 58.03 | 60.88 |
| | a* | −26.02 | −15.98 | −23.79 |
| | b* | −32.81 | −29.05 | −39.97 |
| Fox River Paper | WF | >24 hours | >24 hours | >24 hours |
| | OD | 1.27 | 0.97 | 1.13 |
| | L* | 55.31 | 56.17 | 61.43 |
| | a* | −27.54 | −16.81 | −24.97 |
| | b* | −34.52 | −35.34 | −42.51 |
| KG Paper | WF | >24 hours | 24 hours | >24 hours |
| | OD | 1.25 | 1.02 | 1.24 |
| | L* | 55.30 | 55.03 | 60.24 |
| | a* | −26.52 | −16.64 | −24.66 |
| | b* | −35.11 | −36.59 | −45.25 |
| HP Premium Inkjet Transparency | | transparent | transparent | transparent |

The surface-modified colored pigment prepared by the process of the present invention provided, even in an un-optimized formulation, good print properties and an attractive alternative to commercially available dye and pigment color products. The resulting ink jet inks produced an aesthetically pleasing blue print which, as indicated by the tristimulus values and was water-resistant.

As noted above, the surface-modified colored pigment prepared by the process of the present invention may be useful in a wide variety of aqueous or solvent based applications and, in particular, ink compositions to provide the desired color and intensity. Unlike conventional pigments, the surface-modified colored pigment is readily dispersed in the desired liquid vehicle. In addition, the surface-modified colored pigment is colloidally stable in the liquid vehicle and does not require conventional milling, nor the aid of a dispersant. The surface-modified colored pigment requires only low shear mixing or stirring into the liquid vehicle.

The foregoing description of preferred embodiments of the invention has been presented for purposes of illustration and description. It is not intended to be exhaustive or to limit the invention to the precise form disclosed, and modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A process for preparing surface-modified colored pigments comprising the steps of:
    (a) preparing a reaction batch comprising a treating agent and a diazotizing agent in a liquid medium, wherein said treating agent comprises at least one diazotizable group;
    (b) adding a colored pigment to said reaction batch; and
    (c) mixing said colored pigment and said reaction batch under high shear conditions to form a reaction product comprising a surface-modified colored pigment.

2. The process of claim 1, wherein said reaction batch is prepared by mixing said treating agent and diazotizing agent to form a diazonium salt under high shear conditions.

3. The process of claim 2, wherein said mixing of said reaction batch is accomplished by utilizing equipment providing a grinding action.

4. The process of claim 2, wherein said mixing of said reaction batch is accomplished by utilizing equipment providing an impacting action.

5. The process of claim 2, wherein said mixing of said reaction batch is accomplished by utilizing equipment providing particle size reduction.

6. The process of claim 2, wherein said mixing is accomplished by means of a horizontal or vertical media mill.

7. The process of claim 6, wherein said media mill is an attritor.

8. The process of claim 6, wherein said media mill comprises grinding media.

9. The process of claim 8, wherein said grinding media is ceramic.

10. The process of claim 1, wherein said mixing of step (c) is accomplished by utilizing equipment providing a grinding action.

11. The process of claim 1, wherein said mixing of step (c) is accomplished by utilizing equipment providing an impacting action.

12. The process of claim 1, wherein said mixing of step (c) is accomplished by utilizing equipment providing particle size reduction.

13. The process of claim 1, wherein said mixing of step(c) is accomplished by means of a horizontal or vertical media mill.

14. The process of claim 13, wherein said media mill is an attritor.

15. The process of claim 14, wherein said media mill comprises grinding media.

16. The process of claim 15, wherein said grinding media is ceramic.

17. The process of claim 1, which further comprises the step of adding at least one additional increment of treating agent to step (c).

18. The process of claim 1, which further comprises the step of adding at least one additional increment of diazotizing agent to step (c).

19. The process of claim 1, which further comprises the step of adding at least one additional increment of treating agent and diazotizing agent to step (c).

20. The process of claim 1, wherein said colored pigment is first subjected to a size reduction step prior to step (b).

21. The process of claim 1, wherein said diazotizable group is attached to said surface of said colored pigment in an amount sufficient to improve dispersibility of said surface-modified colored pigment in a liquid medium.

22. The process of claim 1, wherein said mixing of step (c) takes place at a temperature between 0° C. and 90° C. for a time period between 30 minutes and 48 hours.

23. The process of claim 22, wherein said mixing of step (c) takes place at a temperature ranging from about 50° C. and 75° C. for a time period between 1 hour and 24 hours.

24. The process of claim 1, wherein said process further comprising the step of:
   (d) purifying or classifying said surface-modified colored pigment to remove unwanted particles and free species.

25. The process of claim 1, wherein said process further comprising the step of:
   (d) exchanging a portion of counterions that are part of said surface-modified colored pigment with at least one different counterion.

26. The process of claim 1, wherein said process further comprising the steps of:
   (d) purifying or classifying said surface-modified colored pigment to remove unwanted particles and free species; and
   (e) exchanging a portion of said surface-modified colored pigment with at least one different counterion.

27. The process of claim 24, wherein said purifying or classifying step of step (d) is accomplished by means of ultrafiltration or ion exchange.

28. The process of claim 24, wherein said purifying or classifying step of step (d) is accomplished by means of centrifugation.

29. The process of claim 25, wherein said exchange of step (d) is accomplished by means of ion exchange.

30. A composition comprising a water-based liquid vehicle and the surface-modified colored pigment produced by the process of claim 1.

31. The composition of claim 30, wherein said composition is an ink jet ink composition.

32. A process for preparing an ink composition comprising the steps of:
   a) preparing a reaction batch comprising a treating agent and a diazotizing agent in a liquid medium, wherein said treating agent comprises at least one diazotizable group;
   b) adding a colored pigment to said reaction batch;
   c) mixing said colored pigment and said reaction batch under high shear conditions to form a reaction product comprising a surface-modified colored pigment;
   d) purifying or classifying said surface-modified colored pigment to remove unwanted particles and free species; and
   e) adding said purified or classified surface-modified colored pigment to a liquid vehicle to form an ink composition.

33. The process of claim 32, further comprising the step of exchanging a portion of said surface-modified colored pigment with at least one different counterion, said step of exchanging to occur either before or after step (d).

34. The process of claim 32, wherein said liquid vehicle is aqueous.

35. The process of claim 32, wherein said ink composition is an ink jet ink.

* * * * *